W. A. J. LOWE.
BASKET.
APPLICATION FILED OCT. 10, 1916.
1,219,969.
Patented Mar. 20, 1917.
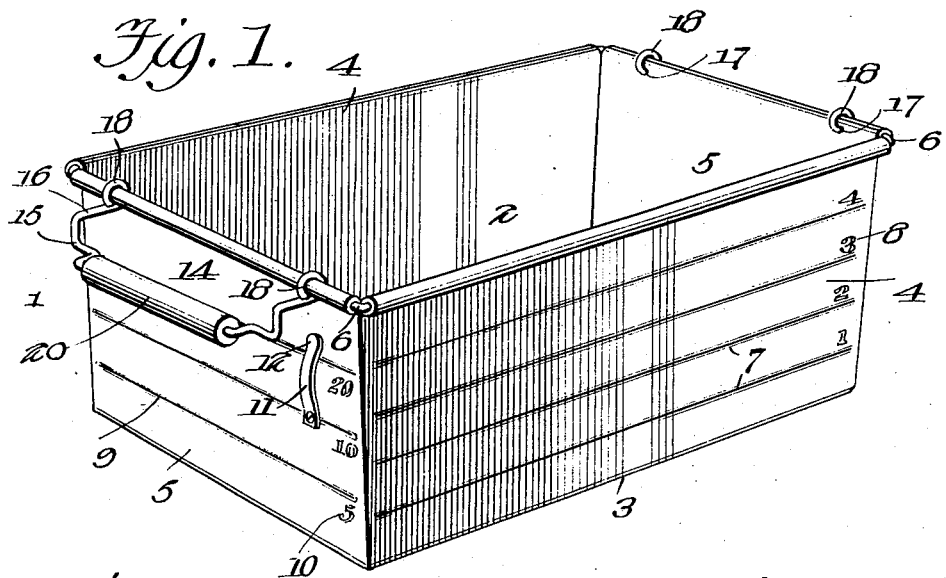
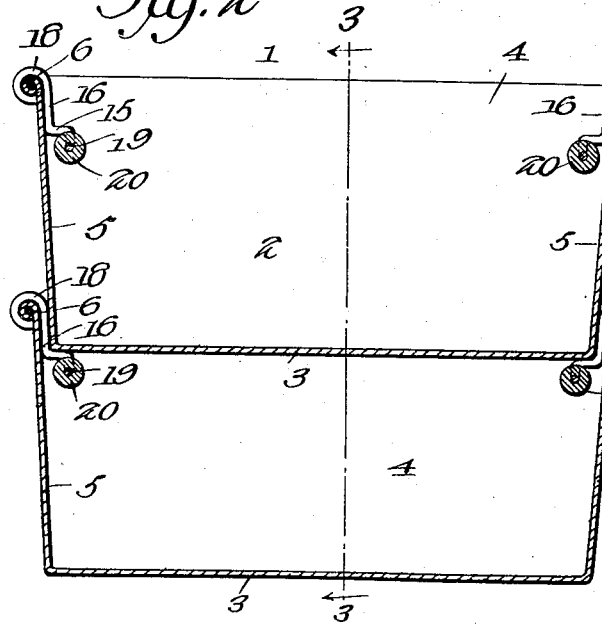
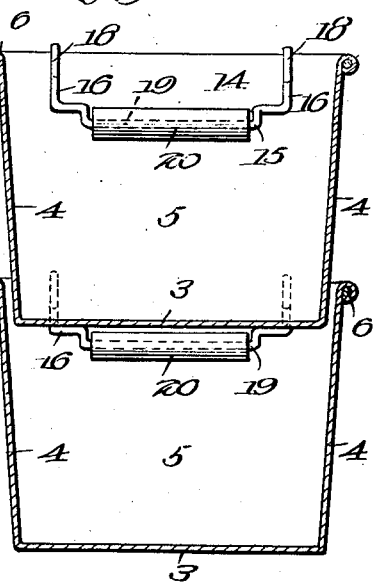
Inventor
W. A. J. Lowe,
By Victor J. Evans
Attorney
Witness
Hugh H. Ott

UNITED STATES PATENT OFFICE.

WILLIAM A. J. LOWE, OF BRISTOL, TENNESSEE, ASSIGNOR OF ONE-HALF TO GEORGE W. OVERSTREET, OF BRISTOL, TENNESSEE.

BASKET.

1,219,969.

Specification of Letters Patent.

Patented Mar. 20, 1917.

Application filed October 10, 1916. Serial No. 124,881.

*To all whom it may concern:*

Be it known that I, WILLIAM A. J. LOWE, a citizen of the United States, residing at Bristol, in the county of Sullivan and State of Tennessee, have invented new and useful Improvements in Baskets, of which the following is a specification.

This invention relates to a basket and more particularly to a basket which is so constructed as to render it especially serviceable to merchants in the delivery of articles such as groceries, provisions, and the like.

The primary object of the invention is to provide a basket of this character which may be constructed from sheet metal and is so shaped that several of the baskets may be arranged in nested formation thereby causing the baskets to occupy a minimum amount of space when in storage or use.

Another object of the invention is to provide a basket of the class described which is provided with handles so shaped and connected with the basket that when the handles are arranged interiorly thereof they provide a support for the basket placed therein when the baskets are arranged in nested formation thus preventing the baskets from sticking together or the contents of the baskets from becoming damaged.

A further object of the invention is to provide a basket for the purpose set forth in which the sides thereof are provided with graduations to enable the basket to be used either as a liquid or dry measure.

A still further object of the invention is to provide the basket with a spring clip by means of which designating tags, and the like, may be easily connected with or removed from the basket as the occasion may require.

With these and other objects in view, the invention resides in the novel combination and arrangement of parts, which will be hereinafter described and particularly pointed out in the claim.

The preferred embodiment of the invention has been illustrated in the accompanying drawing, although no restriction is necessarily made to the precise details of construction therein shown, as changes, alterations, and modifications, within the scope of the claim may be resorted to when desired.

Like characters of reference denote corresponding parts throughout the several views in the drawing, in which:

Figure 1 is a perspective view of a basket constructed in accordance with the invention.

Fig. 2 is a vertical longitudinal sectional view through two baskets constructed in accordance with the invention and arranged in nested formation.

Fig. 3 is a vertical transverse section on the line 3—3 of Fig. 2.

Fig. 4 is a detailed perspective view of one of the basket handles.

Referring now to the drawing in detail, the numeral 1 designates the improved basket, the body 2 of which is formed from any suitable material, such as sheet metal, or the like, and comprises a bottom 3, side walls 4, and end walls 5, said side and end walls being inclined upwardly and outwardly from their intersection with the bottom 3, so that the basket body 2 has a greater width and length at its top than at the bottom thereof.

The upper edges of the side walls 4 and end walls 5 are rolled to secure to the basket body 2 a strengthening frame 6 which may be formed from any suitable material such as heavy gage wire, or the like.

Each of the side walls 4 has formed therein spaced beads or graduations 7 above each of which is stamped a designating character 8 to enable the basket to be used as a dry measure.

The end walls 5 of the basket body, like the side walls 4, have formed therein spaced and transversely extending beads or graduations 9 above each of which is stamped a designating character 10 to enable the basket body to be used as a liquid measure.

A strip of resilient material 11 has one end thereof secured to an end wall 5 of the basket body and has its other end rolled to provide a lip 12 normally held in contact with the exterior face of the end wall 5 to which the strip is attached through the inherent resiliency of the metal from which the strip 11 is formed so that said strip may be used as a spring finger for connecting delivery cards, or the like, with the basket 1.

Handles 14 are connected with the end walls 5 of the body 2 through the medium of bails 15 formed from any suitable material, such as heavy gage wire, or the like, said bails being U-shaped to provide each bail with spaced parallel L-shaped arms 16, the free ends of which are passed through openings 17 in the end walls 5 adjacent the strengthening frame 6 and rolled over the strengthening frame to form loops 18 on the arms by means of which the handles 14 are swingingly connected with the body 2, so that when the handles are arranged interiorly of the body 2, a portion of the arms 16 will bear against the end walls 5 of the body to enable the handles 14 to serve as a support for a basket arranged within the body when the baskets are in nested formation as shown in Figs. 2 and 3 in the drawing.

Each bail 15 has an off-set portion 19 between its ends which passes through a sleeve 20 providing the bail 15 with a hand grip.

When it is desired to stack the baskets so that they will occupy very little space when placed in storage, or in a delivery wagon, the handles 14 are arranged within the basket bodies with the L-shaped arms on the handles bearing against the end walls 5 of the body so that the handles 14 form a support for a basket placed thereon and prevent the contents of the basket from becoming injured by the weight of the basket placed therein.

Through the provision of the beads or graduations on the side and end walls of the basket body, the basket may be used as either a liquid or dry measure while the spring finger connected with one end wall 5 thereof enables delivery cards to be easily and quickly applied to the basket or detached therefrom as the occasion may require.

From the foregoing description, taken in connection with the accompanying drawing, it is at once apparent that a delivery basket has been provided which is simple in construction, therefore inexpensive of manufacture, but highly efficient in use for the purpose described.

Having thus described the invention, what is claimed as new, is:

A basket having graduated side and end walls, a spring finger connected with one of said end walls, U-shaped bails connected with the end walls of the basket for turning movement and adapted to be arranged within the basket to provide a support, L-shaped arms on said bails for contact with the end walls of the basket, off-set portions in said bails, and hand grips mounted on said bails and arranged in said off-set portions.

In testimony whereof I affix my signature.

WILLIAM A. J. LOWE.